United States Patent
He

(10) Patent No.: US 7,426,236 B1
(45) Date of Patent: *Sep. 16, 2008

(54) FEEDFORWARD EQUALIZER FOR DFE BASED DETECTOR

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 692 days.

This patent is subject to a terminal disclaimer.

(21) Appl. No.: 11/011,178

(22) Filed: Dec. 15, 2004

Related U.S. Application Data

(63) Continuation of application No. 09/644,532, filed on Aug. 24, 2000, now Pat. No. 6,870,881.

(51) Int. Cl.
*H03H 7/30* (2006.01)
*H04B 1/10* (2006.01)
*G06F 17/10* (2006.01)

(52) U.S. Cl. .................... 375/232; 375/350; 708/323

(58) Field of Classification Search ................. 375/232, 375/233, 346, 348, 350; 708/319, 322, 323
See application file for complete search history.

(56) References Cited

U.S. PATENT DOCUMENTS

| | | | |
|---|---|---|---|
| RE34,206 E | 3/1993 | Sayar | |
| 5,327,460 A | 7/1994 | Batruni | |
| 5,345,476 A | 9/1994 | Tsujimoto | |
| 5,367,540 A * | 11/1994 | Kakuishi et al. | 375/350 |
| 5,414,733 A * | 5/1995 | Turner | 375/233 |
| 5,513,216 A | 4/1996 | Gadot et al. | |
| 5,561,687 A | 10/1996 | Turner | |
| 5,604,769 A | 2/1997 | Wang | |
| 5,617,450 A * | 4/1997 | Kakuishi et al. | 375/230 |
| 5,748,674 A * | 5/1998 | Lim | 375/233 |
| 5,793,801 A | 8/1998 | Fertner | |
| 6,055,269 A | 4/2000 | Drost et al. | |
| 6,115,418 A | 9/2000 | Raghavan | |
| 6,178,198 B1 | 1/2001 | Samueli et al. | |
| 6,252,904 B1 | 6/2001 | Agazzi et al. | |
| 7,167,516 B1 * | 1/2007 | He | 375/232 |

* cited by examiner

*Primary Examiner*—Young T. Tse

(57) ABSTRACT

A signal processing apparatus includes an input circuit to receive an input signal, and a high-pass filter responsive to the input circuit. The high-pass filter includes M taps to filter precursor intersymbol interference (ISI), one main tap and N taps to filter postcursor ISI. Each of n taps of the N taps is limited to a range of between −1 and 0. The signal processing apparatus includes a decision feedback equalizer. The decision feedback equalizer includes a decision circuit responsive to the high-pass filter, and a feedback filter responsive to the decision circuit. The decision circuit is responsive to the feedback filter.

35 Claims, 6 Drawing Sheets

Related Art

Precursor   Main   Postcursor

FEEDFORWARD EQUALIZER FOR DFE BASED DETECTOR

This application is a continuation of Ser. No. 09/644,532 filed Aug. 24, 2000 now U.S. Pat. No. 6,870,881, the entire contents of which are incorporated by reference herein.

BACKGROUND

1. Field of the Invention

This invention relates generally to a feedforward equalizer used in conjunction with a decision feedback equalizer in a data communications channel. More particularly the present invention relates to a feedforward equalizer used in conjunction with a decision feedback equalizer for a gigabit Ethernet transceiver.

2. Background Information

A feedforward equalizer is an extremely useful component of a digital signal processor used to shape and otherwise to filter an input signal so as to obtain an output signal with desired characteristics. Feedforward equalizers may be used in such diverse fields as Ethernet transceivers, read circuits for disk drives, ghost cancellation in broadcast and cable TV transmission, channel equalization for communication in magnetic recording, echo cancellation, estimation/prediction for speech processing, adaptive noise cancellation, etc.

A feedforward equalizer is particularly suited for filtering inter-symbol interference (ISI). To varying degrees, ISI is always present in a data communications system. ISI is the result of the transmission characteristics of the communications channel, i.e., the "channel response," and, generally speaking, causes neighboring data symbols, in a transmission sequence, to spread out and interfere with one another. If the channel response is bad, or severe, ISI becomes a major impediment to having low error rate communications between two data endpoints. In fact, at higher data rates, i.e., frequencies, the effect of ISI is more severe since there is more high frequency attenuation in the transmission channel. Consequently, current efforts to push transmission speeds higher and higher in the local loop environment must effectively contend with ISI effects on a transmitted data signal to be successful.

Generally speaking, the ISI can be divided into two components, namely precursor and post cursor ISI. Conventionally a feedforward equalizer (FFE) attempts to remove precursor ISI, and decision feedback equalization (DFE) attempts to remove postcursor ISI. FIG. 1 is illustrative of a conventional feedforward equalizer used in conjunction with decision feedback equalizer in a data communications channel. As shown in FIG. 1, an analog input signal from a communication channel is converted to a digital signal by analog-to-digital converter 102. The digital signal is processed by FFE 104 and DFE 105 in a conventional manner. DFE 105 comprises decision circuit 108 and feedback filter 110. Examples of conventional arrangements are discussed in U.S. Pat. Nos. 5,513,216 and 5,604,769, the contents of each of which are incorporated by reference herein.

However, in conventional arrangements, the length of the postcursor ISI is rather large, as shown in FIG. 2. To process a signal with a long tail, the feedback filter needs to have a proportionately large number of taps. This results in higher complexity and severe error propagation.

SUMMARY OF THE INVENTION

According to a first aspect of the present invention, a signal processing apparatus comprises an input circuit to receive an input signal. A feedforward equalizer comprises a high-pass filter and is responsive to the input circuit. A decision feedback equalizer comprises a decision circuit responsive to the feed forward equalizer and a feedback filter responsive to the decision circuit. The decision circuit is responsive to the feedback filter.

According to a second aspect of the present invention, the high-pass filter has a low cutoff frequency.

According to a third aspect of the present invention, the high-pass filter has a flat response.

According to a fourth aspect of the present invention, the high-pass filter has high attenuation at low frequency.

According to a fifth aspect of the present invention, the high-pass filter has high attenuation at low frequencies.

According to a sixth aspect of the present invention, the high attenuation is at least 20 db.

According to a seventh aspect of the present invention, the high-pass filter comprises a first finite impulse response (FIR) filter.

According to an eighth aspect of the present invention, the first FIR filter comprises M taps to filter precursor intersymbol interference (ISI), one main tap and N taps to filter postcursor ISI.

According to a ninth aspect of the present invention, each tap of the first FIR filter has a corresponding coefficient W as follows:

$$W_o = \text{unity}$$

$$0 < \sum_1^M W_{-i} + W_o + \sum_1^n W_i \ll 1, \text{ and}$$

$$-1 < W_1, \ldots, W_n < 0.$$

According to a tenth aspect of the present invention, the input circuit comprises an analog-to-digital converter.

According to an eleventh aspect of the present invention, the decision circuit comprises a threshold circuit.

According to a twelfth aspect of the present invention, the decision circuit comprises a Viterbi detector.

According to a thirteenth aspect of the present invention, a first adaptive control circuit is provided to adapt the M taps for filtering postcursor ISI and N taps for filtering.

According to a fourteenth aspect of the present invention, each of the N taps comprises a limiter to limit the range of adaptation of the N taps.

According to a fifteenth aspect of the present invention, the first adaptive control circuit is operable only during signal acquisition.

According to a sixteenth aspect of the present invention, the feedback filter comprises a second finite impulse response (FIR) filter.

According to a seventeenth aspect of the present invention, a second adaptive control circuit to adapt taps of the second FIR.

According to an eighteenth aspect of the present invention, a signal processing apparatus comprises an input means for receiving an input signal. A feedforward equalizer means is provided for feedforward equalizing by high-pass filtering the input signal received by the input means. A decision feedback equalizer means comprises a decision means for recovering data from an output of the feedforward equalizer means and a feedback filter means for filtering an output of the decision means. The decision means is responsive to the feedback filter means.

According to a nineteenth aspect of the present invention, the feedforward equalizer means has a low cutoff frequency.

According to a twentieth aspect of the present invention, the feedforward equalizer means has a flat response.

According to a twenty-first aspect of the present invention, the feedforward equalizer means has high attenuation at low frequency.

According to a twenty-second aspect of the present invention, the feedforward equalizer means has high attenuation at low frequencies.

According to a twenty-third aspect of the present invention, the feedforward equalizer means shortens a length of postcursor inter-symbol interference.

According to a twenty-fourth aspect of the present invention, the feedforward equalizer means attenuates any DC noise.

According to a twenty-fifth aspect of the present invention, the feedforward equalizer means attenuates baseline wander.

According to a twenty-sixth aspect of the present invention, the high attenuation is at least 20 dB.

According to a twenty-seventh aspect of the present invention, the feedforward equalizer means comprises a first finite impulse response (FIR) filter means for filtering the input signal.

According to a twenty-eighth aspect of the present invention, the first FIR filter means comprises M taps for filtering precursor ISI, one main tap and N taps for filtering postcursor ISI.

According to a twenty-ninth aspect of the present invention, each tap of the first FIR filter means has a corresponding coefficient W as follows:

$$W_o = \text{unity}$$

$$0 < \sum_{1}^{M} W_{-i} + W_o + \sum_{1}^{n} W_i << 1, \text{ and}$$

$$-1 < W_1, \ldots, W_n < 0.$$

According to a thirtieth aspect of the present invention, the input means comprises an analog-to-digital converter means for converting an analog input signal to a digital signal.

According to a thirty-first aspect of the present invention, the decision means comprises a threshold circuit.

According to a thirty-second aspect of the present invention, the decision means comprises a Viterbi detector.

According to a thirty-third aspect of the present invention, a first adaptive control means is provided for adapting the M taps for filtering precursor ISI and N taps for filtering.

According to a thirty-fourth aspect of the present invention, each of the N taps comprises a limiting means for limiting the range of adaptation of the N taps.

According to a thirty-fifth aspect of the present invention, the first adaptive control means is operable only during signal acquisition.

According to a thirty-sixth aspect of the present invention, the feedback filter means comprises a second finite impulse response (FIR) filter means for filtering the output of the decision means.

According to a thirty-seventh aspect of the present invention, a second adaptive control means is provided for adapting taps of the second FIR means.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

The present invention will now be described with reference to a feedforward equalizer used in an Ethernet transceiver device. Preferably, the feedforward equalizer (FFE) is embodied in an Integrated Circuit disposed between a digital interface and an RJ45 analog jack. The Integrated Circuit may be installed inside a PC on the network interface card or the motherboard, or may be installed inside a network switch or router. However, other embodiments include applications in read circuits for disk drives, ghost cancellation in broadcast and cable TV transmission, channel equalization for communication in magnetic recording, echo cancellation, estimation/prediction for speech processing, adaptive noise cancellation, etc. All such embodiments are included within the scope of the appended claims.

Moreover, while the invention will be described with respect to the functional elements of the FFE, the person of ordinary skill in the art will be able to embody such functions in discrete digital or analog circuitry, or as software executed by a general purpose processor (e.g., a CPU) or digital signal processor.

Figure 9:
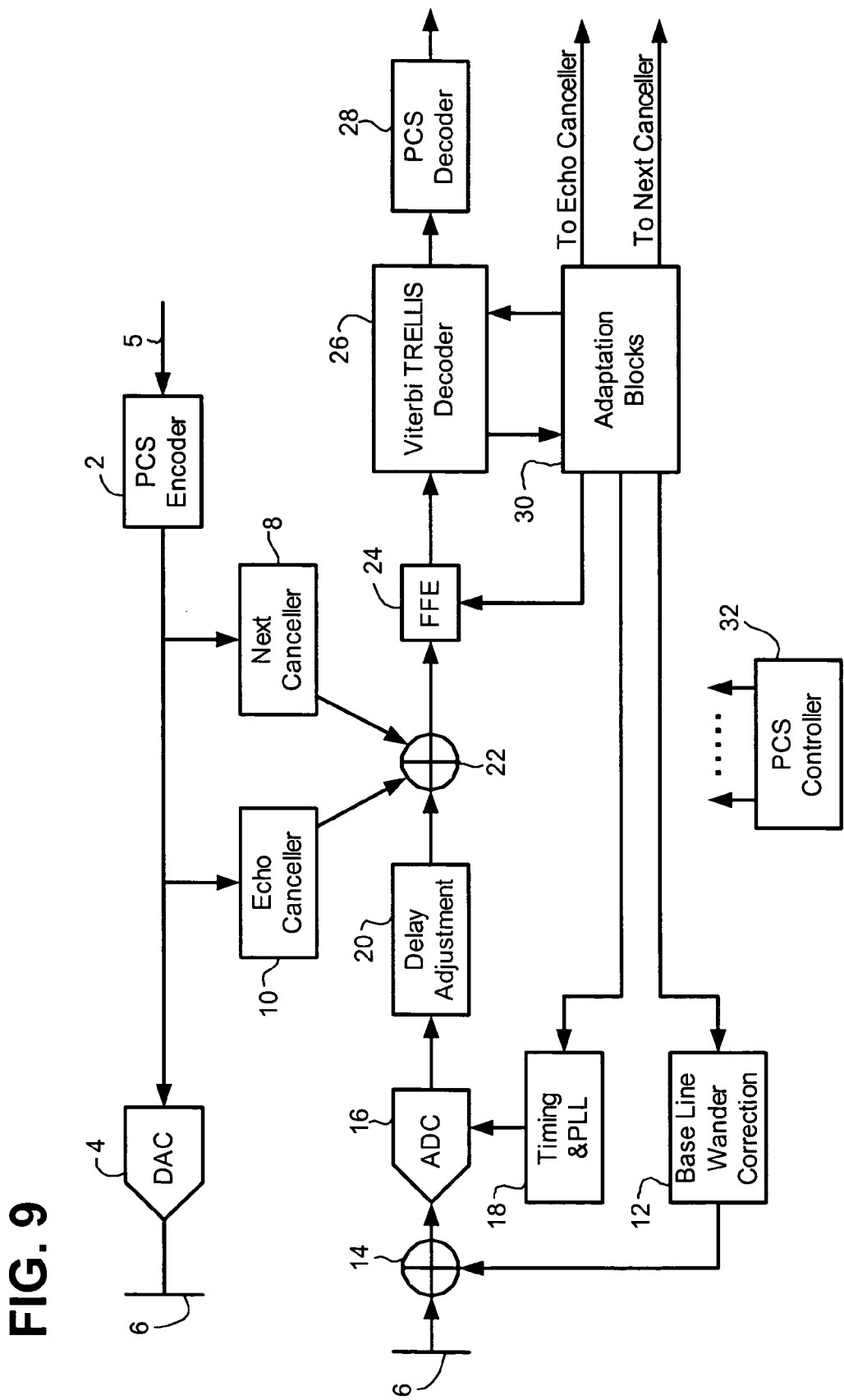
FIG. 9 is a block diagram of an Ethernet transceiver incorporating the feedforward equalizer used in conjunction with a decision feedback equalizer, in accordance with the present invention.

A functional block diagram of an Ethernet transceiver incorporating the FFE according to the present invention is depicted in FIG. 9. Although only one channel is depicted therein, four parallel channels are typically used in Gigabit Ethernet applications. Only one channel is depicted and described herein for clarity.

A 125 MHz, 250 Mbps digital input signal from a PC is PCS-encoded in a PCS encoder 2 and is then supplied to a D/A converter 4 for transmission to the Ethernet cable 6. The PCS-encoded signal is also supplied to a NEXT (Near End Transmitter) noise canceller 8 and to adaptive echo canceller 10.

Signals from the Ethernet cable 6 are received at adder 14 and added with correction signals supplied from baseline wander correction block 12 (which corrects for DC offset). The added signals are then converted to digital signals in the A/D converter 16, as controlled by timing and phase-lock-loop block 18. The digital signals from A/D converter 16 are supplied to delay adjustment block 20, which synchronizes the signals in accordance with the four parallel Ethernet channels. The delay-adjusted digital signals are then added with the echo-canceled signals and the NEXT-canceled signals in adder 22.

The added signals are supplied to a Feed Forward Equalizer filter 24 which filters the signal prior to DFE, or, more specifically, Viterbi trellis decoding in decoder 26. After Viterbi decoding, the output signal is supplied to PCS decoder 28, after which the PCS-decoded signal is supplied to the PC.

The decoder 26 also supplies output signals to a plurality of adaptation blocks schematically depicted at 30 in FIG. 9. As is known, such adaptation blocks carry out corrections for such conditions as temperature offset, connector mismatch, etc. The adaptation block 30 provides output to the baseline wander correction circuit 12, the timing and phase-lock-loop circuit 18, the echo canceller 10, and the NEXT canceller 8. Each functional block depicted in FIG. 9 includes a slave state controller (not shown) for controlling the operation and timing of the corresponding block.

Figure 1:
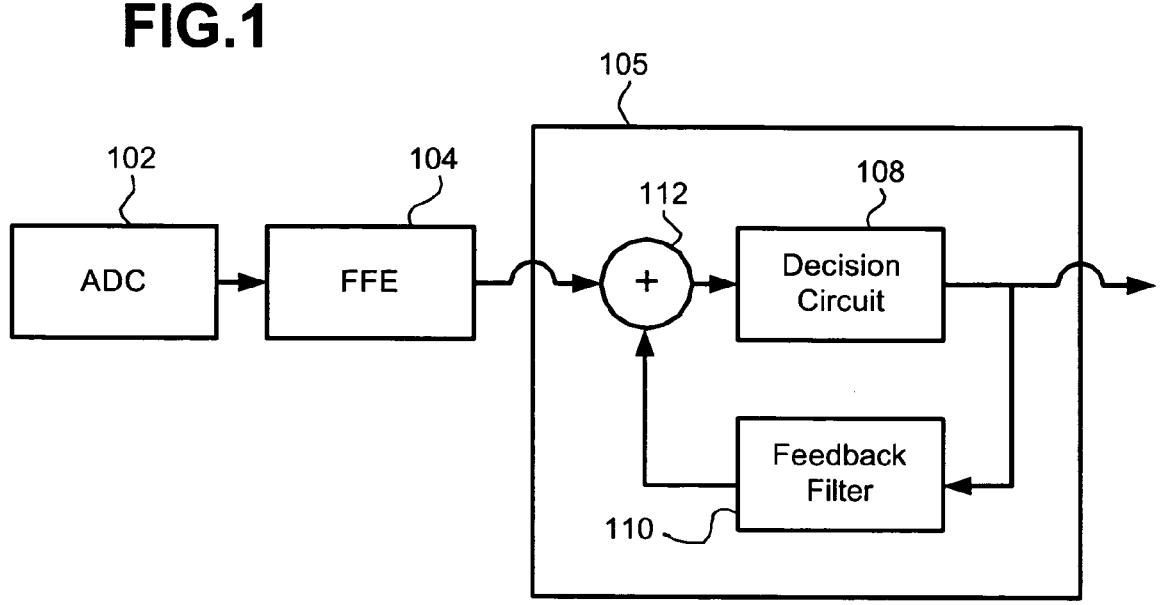
FIG. 1 is a block diagram of a feedforward equalizer used in conjunction with a decision feedback equalizer.
Figure 2:
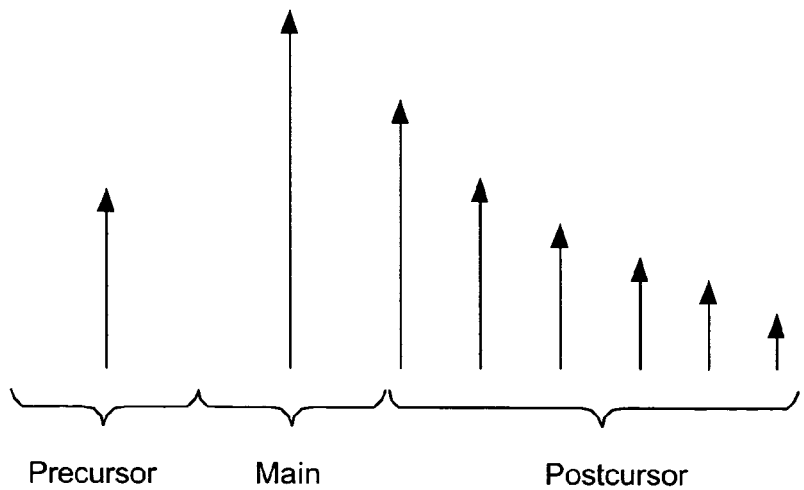
FIG. 2 illustratively shows the length of the postcursor intersymbol interference (ISI) when an input signal is processed by a conventional arrangement.
Figure 3:
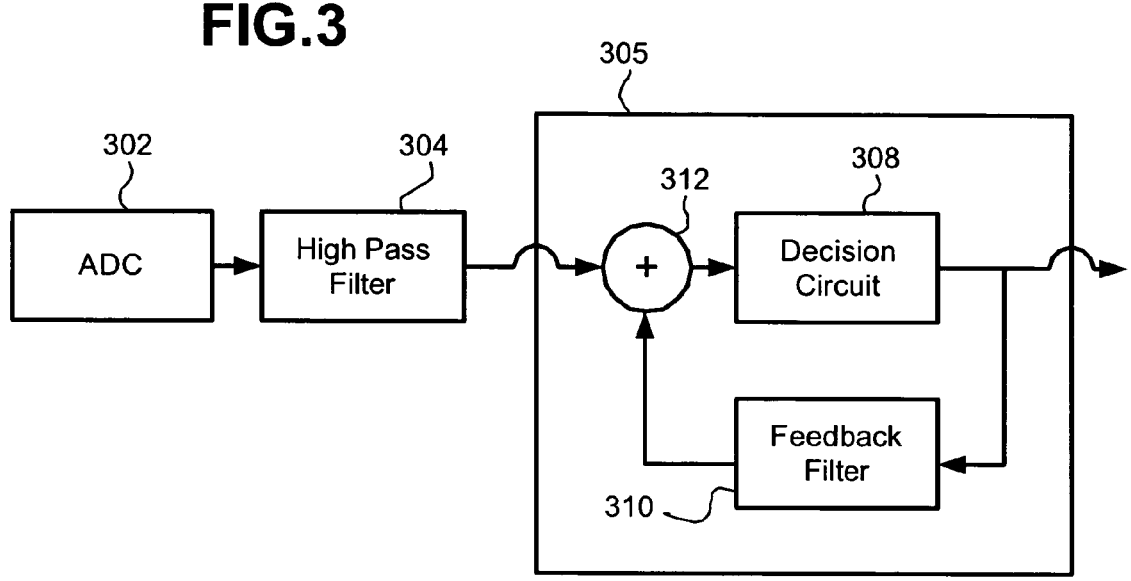
FIG. 3 is a block diagram of a feedforward equalizer implemented as a high-pass filter used in conjunction with a decision feedback equalizer, in accordance with a first embodiment of the present invention.
Figure 4:
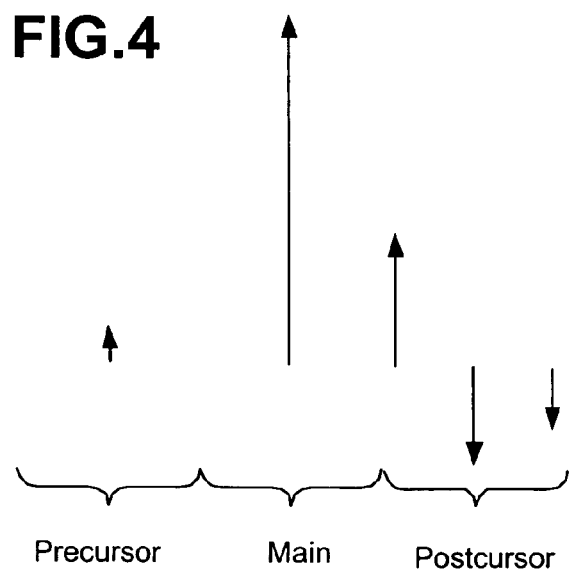
FIG. 4 illustratively shows the length of the postcursor ISI of when an input signal is processed by the present invention.

Reference is now made to FIG. 3 which shows a block diagram of a feedforward equalizer implemented as a high-pass filter used in conjunction with a decision feedback equalizer, in accordance with a first embodiment of the present invention. As shown therein, an analog input signal is converted to a digital signal by analog-to-digital converter (ADC) 302. The FFE 304 processes the digitized input signal to effectively cancel the precursor intersymbol interference (ISI) and shorten the length of the postcursor ISI. FIG. 4 illustratively shows the shortened length of the postcursor ISI when an input signal is processed by FFE 304 of the present invention. FFE 304 is preferably implemented as a high-pass filter to shorten the tail. The output of FFE 304 is then processed by DFE 305 to effectively cancel the postcursor ISI in a known manner. DFE 305 comprises decision circuit 308 and feedback filter 310. Decision circuit 308 may be implemented by, for example, a threshold circuit, a Viterbi detector or the like. Feedback filter 310 is preferably implemented as a Finite Impulse Response (FIR) filter.

Figure 5:
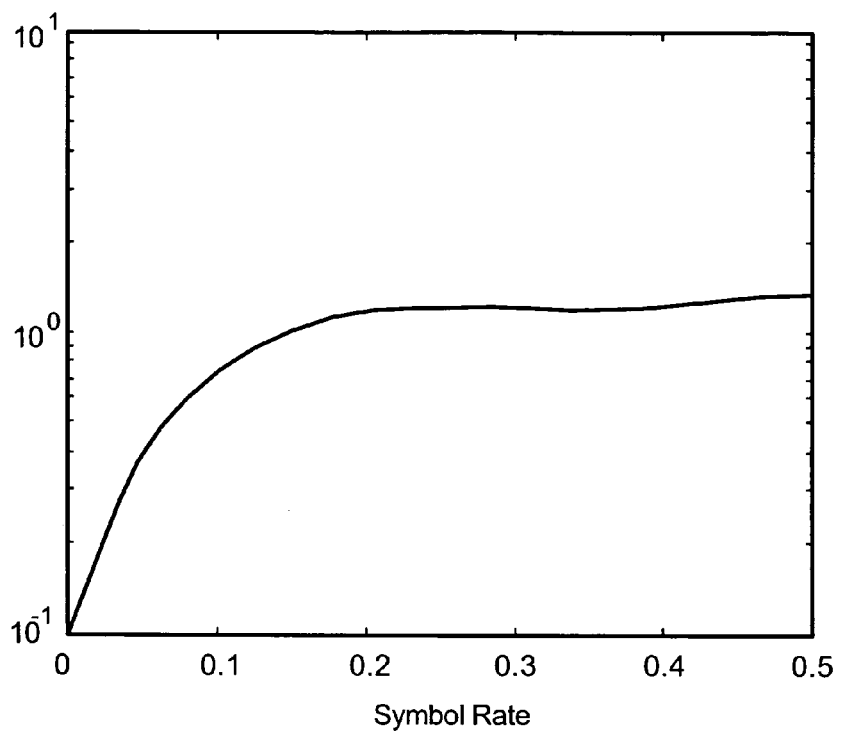
FIG. 5 illustrates the frequency response of the high-pass filter in accordance with FIG. 3.

FIG. 5 illustrates the response characteristics of high-pass filter of FFE 304. The filter has a low cutoff frequency. As can be seen in FIG. 5, at higher frequencies the filter has a relatively flat response and has high attenuation at low frequencies (preferably 20 db). This characteristic is advantageous in attenuating any DC noise and any DC components caused by baseline wander. Significantly, the flat response reduces noise enhancement.

Figure 6:
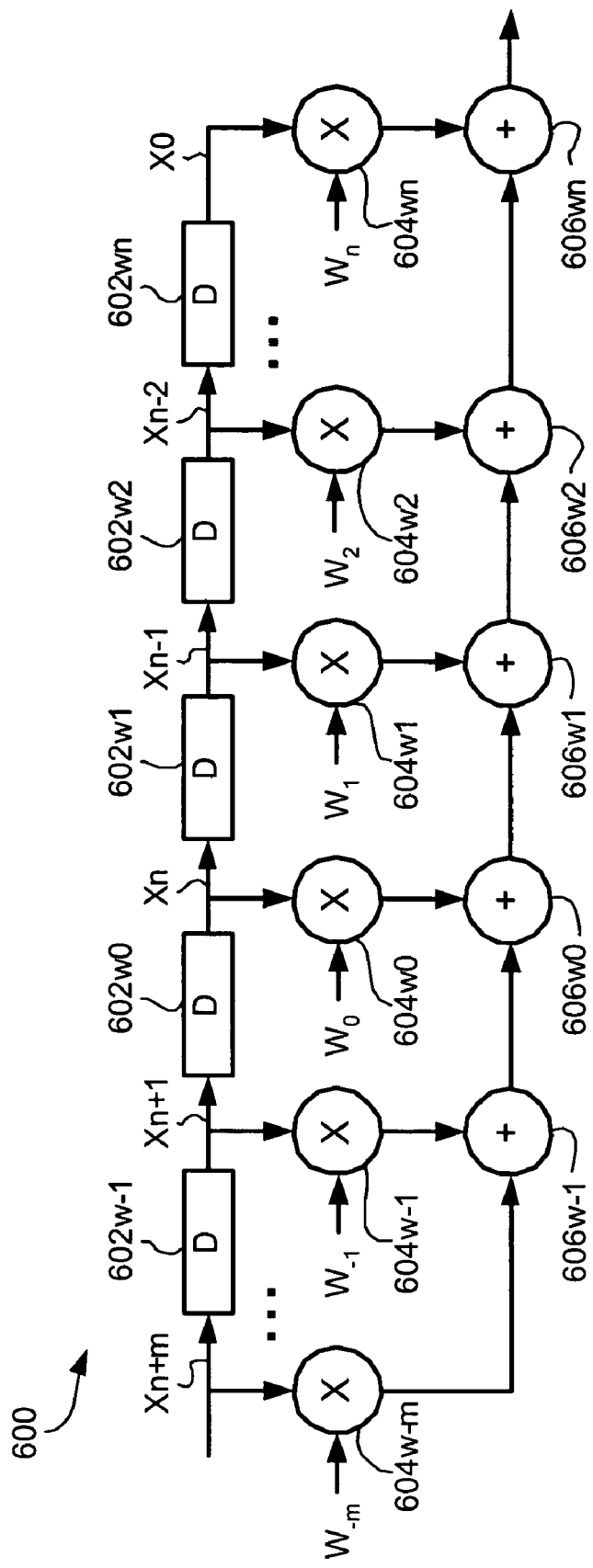
FIG. 6 is a schematic drawing of the high-pass filter of FIG. 3 implemented as an finite impulse response (FIR) filter.

Referring now to FIG. 6, high-pass filter 304 is preferably implemented as a finite impulse response (FIR) filter 600. FIR filter 600 comprises M taps for filtering precursor ISI, one main tap and N taps for filtering postcursor ISI. In the preferred embodiment M=1 and N=3. Each tap comprises a delay 602 (except for the first tap), a multiplier 604 and a summer 606 (except for the first tap). Delay circuit 602 delays an output from a previous tap, and multiplier 604 multiples the output from delay circuit 602 by a coefficient W. The output of multiplier 604 is added to an output from of previous tap by summer 606.

The selection of the coefficients W is critical in providing the response defined in FIG. 5. The appropriate selection of coefficients $W_1, \ldots, W_n$ determines the sharpness of the response, and the appropriate selection of coefficients $W_{-m}$-$W_{-1}$ effectively cancels the precursor tail. In the present embodiment the coefficients are selected from the following constraints:

$$W_o = \text{unity}$$

$$0 < \sum_1^M W_{-i} + W_o + \sum_1^n W_i \ll 1$$

$$-1 < W_1, \ldots, W_n < 0,$$

in the preferred embodiment $$W_0 = 1;$$

$$W_1 = -0.1;$$

$$W_{-1} + W_0 + W_1 + W_2 + W_3 = 0.1;$$

$$|W_1| > |W_2| > |W_3|; \text{ and}$$

$$-1 < W_1, W_2, W_3 < 0, \text{ preferably } W_1 = -0.35, W_2 = -0.25, \text{ and } W_3 = -0.20.$$

As will be appreciated by one of ordinary skill in the art, the preferred values discussed above may be proportionately varied to still achieve very similar and acceptable responses.

Figure 7:
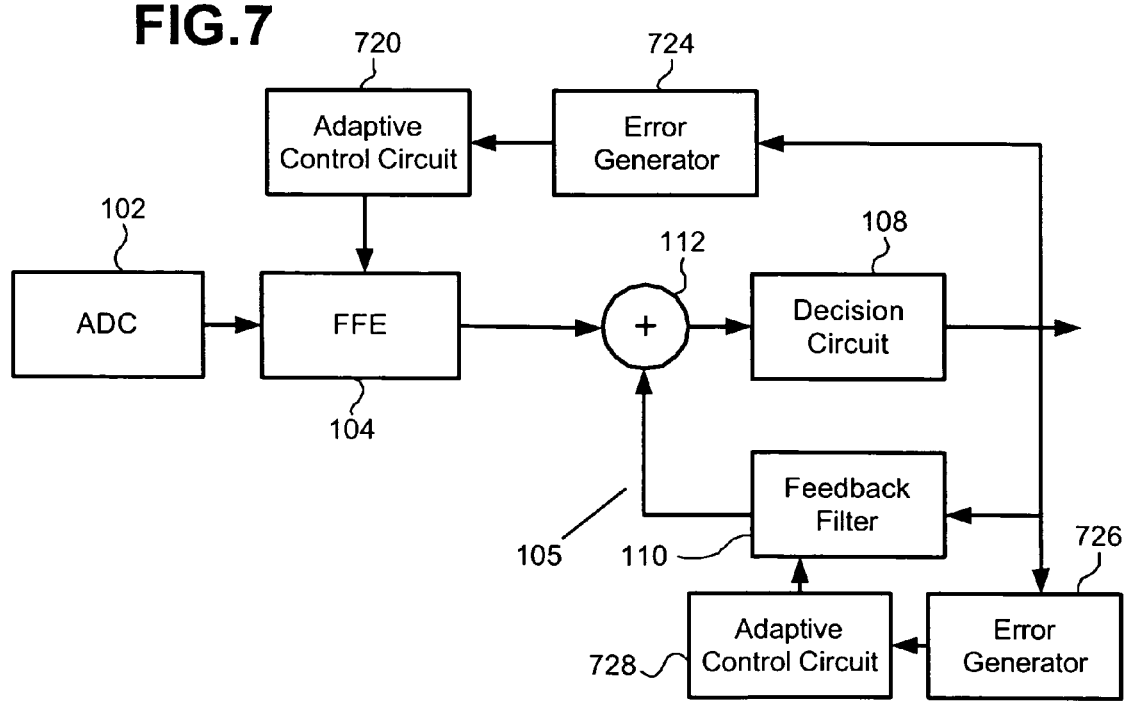
FIG. 7 is a block diagram of a feedforward equalizer implemented as an adaptive high-pass filter used in conjunction with a decision feedback equalizer, in accordance with a second embodiment of the present invention.

FIG. 7 is an alternate embodiment of the present invention, in which the coefficients of the FIR filter of the FFE are adaptive and the coefficients of the FIR filter of the feedback filter are also adaptive. In general, an error generator circuit 724 is provided to determine any errors during signal acquisition, and an error signal is provided to an adaptive control circuit 720 to move the coefficients of the FFE. These coefficients of the FFE are only moved during signal acquisition. After acquisition, the coefficients of the FFE are then held at the values determined during acquisition. Also, an error generator 726 determines if there are any errors from feedback filter 110 and provides an error signal to adaptive control circuit 728. Adaptive control circuit 728 moves coefficients for feedback filter 110.

Figure 8:
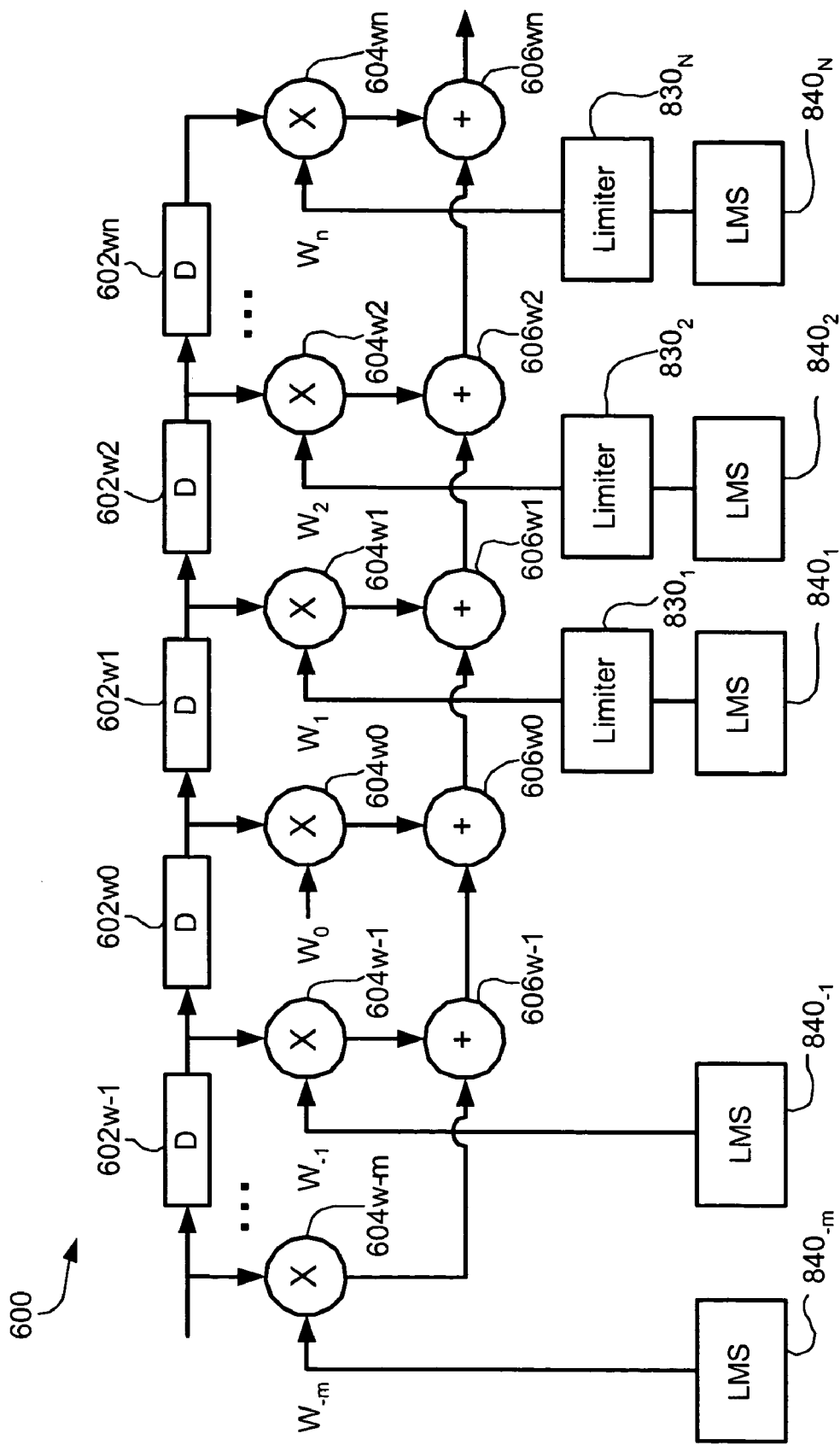
FIG. 8 is a schematic drawing of the high-pass filter of FIG. 7 implemented as an adaptive finite impulse response (FIR) filter.

FIG. 8 shows a more detailed schematic of an adaptive FIR filter for FFE 104. As shown therein, the main tap $W_0$ is kept at its initial value and is not adapted. Coefficients $W_{-m}, \ldots, W_{-1}$ can be determined by LMS engines $840_{-m}, \ldots, 840_{-1}$ in accordance with a least mean square (LMS) algorithm based on gradient optimization. The change in tap weight coefficients $\Delta W_n$ is calculated to be $\Delta W_n = \Delta * X_n * E_n$, where $\Delta$ is the adaptation rate and E is the error output by the error generator 724. Coefficients $W_1, \ldots, W_n$ are similarly determined by LMS engines $840_1, \ldots, 840_n$. In addition limiters $830_1, \ldots, 830_n$ are provided to enforce the constraints discussed above.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A signal processing apparatus, comprising:
   an input circuit to receive an input signal;
   a high-pass filter responsive to the input circuit,
      wherein the high-pass filter comprises M taps to filter precursor intersymbol interference (ISI), one main tap and N taps to filter postcursor ISI, and
      wherein each of n taps of the N taps is limited to a range of between −1 and 0, wherein n and N are integer values greater than or equal to 1 and wherein N is greater than or equal to n; and
   a decision feedback equalizer, comprising:
      a decision circuit responsive to the high-pass filter; and
      a feedback filter responsive to the decision circuit,
         wherein the decision circuit is responsive to the feedback filter.

2. The signal processing apparatus of claim 1, wherein the high-pass filter comprises a low cutoff frequency.

3. The signal processing apparatus of claim 2, wherein the high-pass filter comprises a flat response.

4. The signal processing apparatus of claim 1, wherein the high-pass filter comprises an attenuation of at least 20 dB.

5. The signal processing apparatus of claim 1, wherein the input circuit comprises an analog-to-digital converter.

6. The signal processing apparatus of claim 1, wherein the decision circuit comprises a threshold circuit.

7. The signal processing apparatus of claim 1, wherein the decision circuit comprises a Viterbi detector.

8. The signal processing apparatus of claim 1, wherein the feedback filter comprises a finite impulse response (FIR) filter.

9. The signal processing apparatus of claim 8, further comprising:
   an adaptive control circuit to adapt taps of the FIR filter.

10. The signal processing apparatus of claim 1, wherein the high-pass filter comprises a feedforward equalizer.

11. An Ethernet transceiver, comprising the signal processing apparatus of claim 1.

12. A signal processing apparatus, comprising:
   input means for receiving an input signal;
   high-pass filtering means for filtering the input signal received by the input means,
      wherein the high-pass filtering means comprises M taps to filter precursor intersymbol interference (ISI), one main tap and N taps to filter postcursor ISI, and
      wherein each of n taps of the N taps is limited to a range of between −1 and 0, wherein n and N are integer values greater than or equal to 1 and wherein N is greater than or equal to n; and
   means for decision feedback equalizing, comprising:
      decision means responsive to the high-pass filtering means for recovering data from an output of the high-pass filtering means; and
      feedback filter means for filtering an output of the decision means,
         wherein the decision means is responsive to the feedback filter means.

13. The signal processing apparatus of claim 12, wherein the high-pass filtering means comprises a low cutoff frequency.

14. The signal processing apparatus of claim 13, wherein the high-pass filtering means comprises a flat response.

15. The signal processing apparatus of claim 12, wherein the high-pass filter means comprises an attenuation of at least 20 dB.

16. The signal processing apparatus of claim 12, wherein the high-pass filtering means shortens a length of the postcursor ISI.

17. The signal processing apparatus of claim 12, wherein the high-pass filtering means attenuates DC noise.

18. The signal processing apparatus of claim 12, wherein the high-pass filtering means attenuates baseline wander.

19. The signal processing apparatus of claim 12, wherein the input means comprises an analog-to-digital converter means for converting an analog input signal to a digital signal.

20. The signal processing apparatus of claim 12, wherein the decision means comprises a threshold circuit.

21. The signal processing apparatus of claim 12, wherein the decision means comprises a Viterbi detector.

22. The signal processing apparatus of claim 12, wherein the feedback filter means comprises a finite impulse response (FIR) filter means for filtering the output of the decision means.

23. The signal processing apparatus of claim 22, further comprising:
   an adaptive control means for adapting taps of the FIR filter means.

24. The signal processing apparatus of claim 12, wherein the high-pass filtering means comprises a feedforward equalizer means for feedforward equalizing.

25. An Ethernet transceiver, comprising the signal processing apparatus of claim 12.

26. A method of processing an input signal, comprising:
   receiving the input signal;
   high-pass filtering the received input signal using M taps to filter precursor intersymbol interference (ISI), one main tap and N taps to filter postcursor ISI,
      wherein each of n taps of the N taps is limited to a range of between −1 and 0, where n and N are integer values greater than or equal to 1 and N is greater than or equal to n; and
   decision feedback equalizing the high-pass filtered input signal comprising:
      recovering data based on the high-pass filtered input signal; and
      filtering the recovered data,
         wherein the recovered data is recovered based on the filtered recovered data.

27. The method of claim 26, wherein high-pass filtering the received input signal includes a low cutoff frequency.

28. The method of claim 27, wherein high-pass filtering the received input signal includes a flat response.

29. The method of claim 26, wherein high-pass filtering the received input signal includes an attenuation of at least 20 dB.

30. The method of claim 26, wherein high-pass filtering the received input signal shortens a length of the postcursor ISI.

31. The method of claim 30, wherein high-pass filtering the received input signal attenuates DC noise.

32. The method of claim 30, wherein high-pass filtering the received input signal attenuates baseline wander.

33. The method of claim 30, wherein receiving the input signal comprises converting an analog input signal to a digital signal.

34. The method of claim 30, wherein filtering the recovered data comprises finite impulse response (FIR) filtering the recovered data.

35. The method of claim 34, comprising adapting the FIR filtering to filter the recovered data.

* * * * *

UNITED STATES PATENT AND TRADEMARK OFFICE
CERTIFICATE OF CORRECTION

PATENT NO. : 7,426,236 B1  Page 1 of 1
APPLICATION NO. : 11/011178
DATED : September 16, 2008
INVENTOR(S) : Runsheng He It is certified that error appears in the above-identified patent and that said Letters Patent is hereby corrected as shown below:

Column 5, Line 66    Delete "of" after "from"

Signed and Sealed this

Fourth Day of November, 2008

JON W. DUDAS
*Director of the United States Patent and Trademark Office*